US012602032B2

(12) United States Patent
Balasubramaniam et al.

(10) Patent No.: US 12,602,032 B2
(45) Date of Patent: Apr. 14, 2026

(54) METHOD AND SYSTEM FOR MANAGING ENTERPRISE DIGITAL AUTOMATION PROCESSES

(71) Applicant: Wipro Limited, Bangalore (IN)

(72) Inventors: Shyamsundar Balasubramaniam, Kent (GB); Anand Ramesh, Croydon (GB); Darshan Nachappa Kokkengada, Kempapura (IN); Jitin Kulkarni, Kalaburagi (IN)

(73) Assignee: Wipro Limited, Bangalore (IN)

( * ) Notice: Subject to any disclaimer, the term of this patent is extended or adjusted under 35 U.S.C. 154(b) by 441 days.

(21) Appl. No.: 18/193,374

(22) Filed: Mar. 30, 2023

(65) Prior Publication Data

US 2023/0418271 A1 Dec. 28, 2023

(30) Foreign Application Priority Data

Jun. 24, 2022 (IN) .............................. 202241036264

(51) Int. Cl.
*G05B 19/418* (2006.01)
*G05B 23/02* (2006.01)
(52) U.S. Cl.
CPC ... *G05B 19/41865* (2013.01); *G05B 19/4184* (2013.01); *G05B 23/0264* (2013.01); *G05B 23/0294* (2013.01)
(58) Field of Classification Search
CPC .......... G05B 19/41865; G05B 19/4184; G05B 23/0264; G05B 23/0294; G06Q 10/063; G06Q 10/0633; G06Q 10/0639; G06Q 10/20
See application file for complete search history.

(56) References Cited

U.S. PATENT DOCUMENTS

| | | | | | |
|---|---|---|---|---|---|
| 8,806,003 | B2 * | 8/2014 | Brown | .................. | G06F 9/5044 |
| | | | | | 709/224 |
| 9,448,824 | B1 * | 9/2016 | Fitzgerald | ........... | G06F 9/45533 |
| 9,465,663 | B2 * | 10/2016 | Mincarelli | ............ | G06F 9/5027 |

(Continued)

FOREIGN PATENT DOCUMENTS

| | | | |
|---|---|---|---|
| EP | 3185124 A | | 6/2017 |
| WO | 2020061707 A1 | | 4/2020 |

*Primary Examiner* — Christopher E. Everett
(74) *Attorney, Agent, or Firm* — Finnegan, Henderson, Farabow, Garrett & Dunner, LLP

(57) ABSTRACT

Disclosed herein is a method and system for managing enterprise digital automation processes. In an embodiment, a plurality of automation requests, related to a plurality of enterprise digital automation processes is prioritized based on an automation requests information. Further, a plurality of tasks from a project application repository is selected for executing the plurality of automation requests. Subsequently, execution of the plurality of automation requests is monitored in real-time by generating a unified portfolio view of the plurality of tasks and by tracking a run-time cost and benefit for each of the plurality of tasks. Furthermore, one or more alerts related to the execution of the plurality of automation requests is generated. Finally, the execution of the plurality of automation requests is optimized by resolving each of one or more alerts using pretrained Artificial Intelligence (AI) model trained on one or more historical events associated with plurality of automation requests.

11 Claims, 4 Drawing Sheets

100

(56) References Cited

U.S. PATENT DOCUMENTS

| | | | | |
|---|---|---|---|---|
| 10,235,192 B2 * | 3/2019 | Hall | .................... | G06F 11/0793 |
| 10,372,508 B2 | 8/2019 | Hosabettu et al. | | |
| 10,860,007 B2 | 12/2020 | Haberkern et al. | | |
| 11,200,539 B2 * | 12/2021 | Iyer | .................... | G06Q 10/0633 |
| 11,433,536 B2 * | 9/2022 | Berg | .................... | G06Q 10/103 |
| 11,449,359 B2 * | 9/2022 | Cleere | .................... | G06Q 40/08 |
| 11,494,713 B2 * | 11/2022 | Yurovsky | ........... | G06Q 10/0631 |
| 11,513,886 B2 * | 11/2022 | Iyer | ......................... | G06N 20/00 |
| 12,099,820 B2 * | 9/2024 | Iyer | ....................... | G06N 3/084 |
| 12,164,934 B1 * | 12/2024 | Damarapati | ............ | G06F 9/451 |
| 12,314,748 B2 * | 5/2025 | Ma | ...................... | G06F 9/45558 |
| 2005/0256946 A1 * | 11/2005 | Childress | ............... | G06Q 10/06 709/223 |
| 2009/0300632 A1 * | 12/2009 | Falcon | .................... | G06Q 10/00 718/103 |
| 2011/0307901 A1 * | 12/2011 | Blanding | ............ | G06F 11/3442 703/21 |
| 2012/0330711 A1 * | 12/2012 | Jain | ....................... | G06F 9/5072 709/224 |
| 2019/0041830 A1 * | 2/2019 | Yarvis | ................. | G05B 19/042 |
| 2019/0155225 A1 | 5/2019 | Kothandaraman et al. | | |
| 2020/0262063 A1 * | 8/2020 | Perera | .................... | B25J 9/1661 |
| 2020/0306970 A1 | 10/2020 | Latkar et al. | | |
| 2020/0334136 A1 | 10/2020 | Ramasamy et al. | | |
| 2021/0107140 A1 * | 4/2021 | Singh | ................. | G06Q 10/0633 |
| 2021/0110318 A1 * | 4/2021 | Singh | .................... | G06Q 10/04 |
| 2021/0294303 A1 * | 9/2021 | Nott | ....................... | G06F 9/4881 |
| 2021/0294644 A1 * | 9/2021 | Nott | ....................... | G06F 9/4881 |
| 2022/0326693 A1 * | 10/2022 | Ma | ................. | G05B 19/41835 |

* cited by examiner

100

METHOD AND SYSTEM FOR MANAGING ENTERPRISE DIGITAL AUTOMATION PROCESSES

TECHNICAL FIELD

The present disclosure, in general, relates to digital automation process, and particularly to a method and system for managing enterprise digital automation processes.

BACKGROUND

In the existing technologies, all the data logs from robots (or BOTs) are being provided by Robotic Process Automation (RPA) adapters and is dependent on the BOTs. Therefore, monitoring and analyzing these data logs requires prior knowledge of all the running BOTs and associated development technology. Hence, for monitoring the entire robotic process, an automation system requires additional configuration level changes. This leads to additional resource requirement and hence improper utilization of the resources.

Further, the existing technologies use ineffective demand forecasting for the automation process, which leads to improper resource planning. Also, in the existing technologies, real-time analytics for software process automation requires interruption to the running interruption process, thereby decreasing the performance of the entire automation system. Thus, there is a need for an effective method of managing enterprise digital automation processes.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a method for managing enterprise digital automation processes. The method comprises prioritizing, by an automation management system, a plurality of automation requests, related to a plurality of enterprise digital automation processes, based on a criticality of the plurality of automation requests, historical resource utilization data and failure data related to one or more historical automation requests that are similar to the plurality of automation requests. Further, the method comprises selecting a plurality of tasks from a project application repository for executing the plurality of automation requests based on a type of the plurality of automation requests and execution requirements of the plurality of automation requests. Thereafter, the method comprises monitoring execution of the plurality of automation requests in real-time by generating a unified portfolio view of the plurality of tasks and by tracking a run-time cost and benefit for each of the plurality of tasks. Furthermore, the method comprises generating in real-time, one or more alerts related to the execution of the plurality of automation requests based on a comparison between a real-time performance of the plurality of automation requests and one or more prestored Key Performance Indicators (KPIs). Finally, the method comprises optimizing the execution of the plurality of automation requests by resolving each of the one or more alerts using a pretrained Artificial Intelligence (AI) model trained on one or more historical events associated with the plurality of automation requests.

Further, the present disclosure relates to an automation management system for managing enterprise digital automation processes. The automation management system comprises a processor and a memory. The memory is communicatively coupled to the processor and stores processor-executable instructions, which on execution, cause the processor to prioritize a plurality of automation requests, related to a plurality of enterprise digital automation processes, based on a criticality of each of the plurality of automation requests, historical resource utilization data and failure data related to one or more historical automation requests that are similar to the plurality of automation requests. Further, the instructions cause the processor to select a plurality of tasks from a project application repository for executing the plurality of automation requests based on a type of the plurality of automation requests and execution requirements of the plurality of automation requests. Thereafter, the instructions cause the processor to monitor execution of the plurality of automation requests in real-time by generating a unified portfolio view of the plurality of tasks and by tracking a run-time cost and benefit for each of the plurality of tasks. Furthermore, the instructions cause the processor to generate in real-time, one or more alerts related to the execution of the plurality of automation requests based on a comparison between a real-time performance of the plurality of automation requests and one or more prestored Key Performance Indicators (KPIs). Finally, the instructions cause the processor to optimize the execution of the plurality of automation requests by resolving each of the one or more alerts using a pretrained Artificial Intelligence (AI) model trained on one or more historical events associated with the plurality of automation requests.

Furthermore, the present disclosure relates to a non-transitory computer readable medium including instructions stored thereon that when processed by at least one processor, cause an automation management system to perform operations comprising prioritizing a plurality of automation requests, related to a plurality of enterprise digital automation processes, based on a criticality of each of the plurality of automation requests, historical resource utilization data and failure data related to one or more historical automation requests that are similar to the plurality of automation requests. Further, the instructions cause the processor to select a plurality of tasks from a project application repository for executing the plurality of automation requests based on a type of the plurality of automation requests and execution requirements of the plurality of automation requests. Thereafter, the instructions cause the processor to monitor execution of the plurality of automation requests in real-time by generating a unified portfolio view of the plurality of tasks and by tracking a run-time cost and benefit for each of the plurality of tasks. Furthermore, the instructions cause the processor to generate in real-time, one or more alerts related to the execution of the plurality of automation requests based on a comparison between a real-time performance of the plurality of automation requests and one or more prestored Key Performance Indicators (KPIs). Finally, the instructions cause the processor to optimize the execution of the plurality of automation requests by resolving each of the one or more alerts using a pretrained Artificial Intelligence (AI) model trained on one or more historical events associated with the plurality of automation requests.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1:
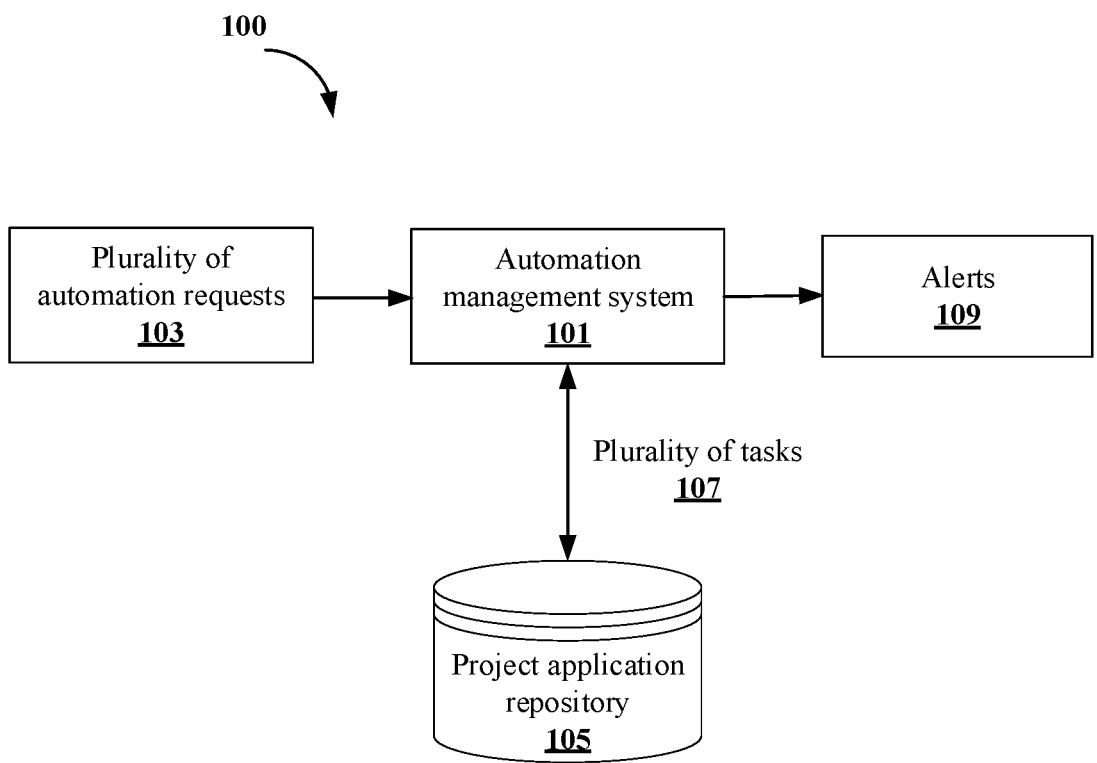
FIG. 1 shows an overview of functioning of an automation management system in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In an embodiment, the present disclosure proposes a method for managing enterprise digital automation processes. In an embodiment, the present disclosure prioritizes a plurality of automation requests, related to a plurality of enterprise digital automation processes. The plurality of automation requests may be prioritized based on an automation requests information. The automation requests information may comprise a criticality of the plurality of automation requests, a historical resource utilization data and a failure data related to one or more historical automation requests that are similar to the plurality of automation requests. Further, the present disclosure selects a plurality of tasks from a project application repository for executing the plurality of automation requests. The plurality of tasks may be selected based on a type of the plurality of automation requests and execution requirements of the plurality of automation requests.

In an embodiment, the present disclosure manages execution of the plurality of automation requests in real-time by generating a unified portfolio view of the plurality of tasks and by tracking a run-time cost and benefit for each of the plurality of tasks. Further, the proposed automation management system generates one or more alerts related to the execution of the plurality of automation requests based on a comparison between a real-time performance of the plurality of automation requests and one or more prestored Key Performance Indicators (KPIs). The automation management system optimizes the execution of the plurality of automation requests by resolving each of the one or more alerts using a pretrained Artificial Intelligence (AI) model trained on one or more historical events associated with the plurality of automation requests. Finally, the one or more alerts are addressed and the execution of the plurality of automation requests is resumed and/or completed.

In an embodiment, the proposed method aims to speed up the automation lifecycle by optimizing its capabilities, such as automation portfolio, to identify right processes to automate, integrated ROI (Return of Investment) dashboard to track benefits in real-time, automation command center to view transactional values to take corrective actions. Also, the proposed method provides a set of Application Program Interface (APIs) which gives the ability to integrate with any automation technologies and solutions.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an overview of functioning of an automation management system, in accordance with some embodiments of the present disclosure.

In an embodiment, the automation management system 101 may be a computing system including, without limiting to, a desktop computer, a laptop, a smartphone, and the like. In an embodiment, an automation management system 101, which may be configured and used for managing enterprise digital automation processes. In an embodiment, the automation management system 101 may be provided with a plurality of automation requests 103 and a plurality of tasks 107 from a project application repository 105. The plurality of automation requests 103 may relate to a plurality of enterprise digital automation process. In an embodiment, a user may input one or more Standard Operating Procedure (SOP) documents for process automation initiatives and/or automation deployment to the automation management system 101.

In an embodiment, upon receiving the plurality of automation requests 103, the automation management system 101 prioritizes the plurality of automation requests 103 based on information associated with the plurality of automation requests 103 or automation requests information. The automation requests information may comprise, without limiting to, a criticality of the plurality of automation requests 103, historical resource utilization data and failure data related to one or more historical automation requests that are similar to the plurality of automation requests 103. In an embodiment, the plurality of automation requests 103 may be compared with a predefined automation criterion. Further, the plurality of automation requests 103 may be mapped with preconfigured templates stored in a template repository. Furthermore, the plurality of tasks 107 corresponding to each of the plurality of automation requests 103 may be identified by performing various analysis including, without limiting to, a feasibility analysis, a t-shirt size estimation, a Return of Investment (ROI) analysis and a business case creation. In an embodiment, the prioritizing may also require a user approval.

In an embodiment, subsequent to prioritizing a plurality of automation requests 103, the automation management system 101 selects the plurality of tasks 107 from a project application repository 105 for executing the plurality of automation requests 103 based on a type of the plurality of automation requests 103 and execution requirements of the plurality of automation requests 103. As an example, if the plurality of automation requests 103 is related to a Human Resource (HR) business, then HR business related tasks are loaded from the project application repository 105. Further, based on the plurality of tasks 107 selected from the project application repository 105, the plurality of tasks 107 is executed, and the executed real-time data is stored in the project application repository 105.

In an embodiment, upon selecting the plurality of tasks 107, the automation management system 101 monitors the execution of the plurality of automation requests 103 in real-time by generating a unified portfolio view of the plurality of tasks 107 and by tracking a run-time cost and benefit for each of the plurality of tasks 107. In an embodiment, a plurality of automation agents may be deployed for rectifying one or more machine-level service glitches, application failures and automation breakdowns during the execution of the plurality of automation requests 103. The automation management system 101 may restart the execution of the plurality of automation request in case of one or more machine-level service glitches, application failures and automation breakdowns. Also, the automation management system 101 may generate an execution status report for each of the plurality of automation requests 103. The automation management system 101 may have its own Representational State Transfer (REST) Application Programming Interface (APIs), which may enable the automation management system 101 to be integrated with any automation technologies for monitoring and reporting. Further, the automation management system 101 may utilize alert watcher agents that resides in an automation machine to provide local system, application and process related traps (real-time system information, application information and automation health). In an embodiment, the user may be able to track the real-time benefits against the original one by provided by the KPI analysis. Further, the user may be displayed automation's screen view through REST APIs and may be provided with a real-time view of individual bots with health status and transactions processed. The automation management system 101 may provide a custom Screen share option with the automation runner machine.

In an embodiment, upon monitoring the plurality of tasks 107, the automation management system 101 generates, in real time, one or more alerts 109 related to the execution of the plurality of automation requests 103 based on a comparison between a real-time performance of the plurality of automation requests 103 and one or more prestored Key Performance Indicators (KPIs). The one or more alerts 109 indicate at least one of an overloading of software automation, an underutilization of the software automation, an application issue, a Central Processing Unit (CPU) issue, a memory issue, an unexpected window title, a system issue, a breach of Service Level Agreement (SLA), and an exception raise. Further, the one or more alerts 109 may be related to an operational insight and/or a business insight and/or an application insight. In an embodiment, when the one or more alert is generated, a ticket corresponding to one or more failed automation requests may be created. Further, the ticket may be notified to one or more predefined automation controllers for rectifying the one or more failed automation requests. This reduces the exception handling time and allows for the automation to quickly be brought back to an active mode.

In an embodiment, upon generating the one or more alerts 109, the automation management system 101 optimizes the execution of the plurality of automation requests 103 by resolving each of the one or more alerts 109 using a pretrained Artificial Intelligence (AI) model trained on one or more historical events associated with the plurality of automation requests 103. In an embodiment, the business KPIs may also be considered while resolving the one or more alerts 109. Further, the automation management system 101 provides an auto heal capability which automatically resumes struck automation system back to running using one or more API agents. The automation management system 101 triggers the auto heal functionality based on different traps. As an example, a trap may be an application trap for Central Processing Unit (CPU), an application trap on memory utilization, system traps on window titles, CPU and memory of the application and process transoft error. Further, the automation management system 101 provides an operational level control to reduce downtime. Finally, the one or more alerts 109 are addressed and the execution of the plurality of automation requests 103 is resumed and/or completed.

Figure 2:
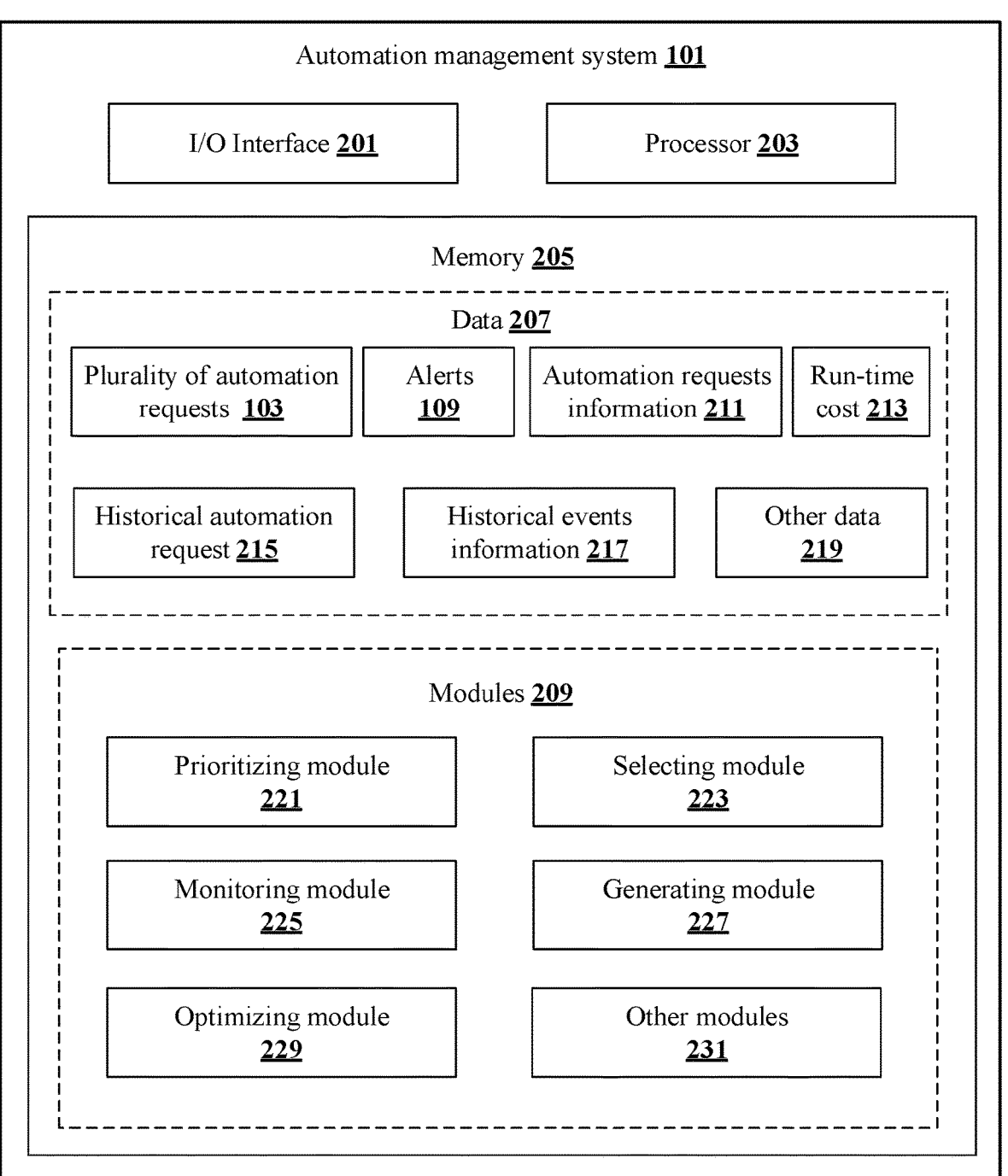
FIG. 2 shows a detailed block diagram of an automation management system in accordance with some embodiments of the present disclosure.

FIG. 2 shows a detailed block diagram of an automation management system 101 in accordance with some embodiments of the present disclosure.

In an embodiment, the automation management system 101 may include an I/O interface 201, a processor 203 and a memory 205. The processor 203 may be configured to perform one or more functions of the automation management system 101 for managing enterprise digital automation processes, using the data 207 and the one or more modules 209 in stored in a memory 205 of the automation management system 101. In an embodiment, the memory 205 may store data 207 and one or more modules 209.

In an embodiment, the data 207 may be stored in the memory 205 may include, without limitation, a plurality of automation requests 103, one or more alerts 107, an automation requests information 211, a run-time cost 213, one or more historical automation requests 215, one or more historical events information 217 and other data 219. In some implementations, the data 207 may be stored within the memory 205 in the form of various data structures. Additionally, the data 207 may be organized using data models, such as relational or hierarchical data models. The other data 219 may include various temporary data and files generated by the one or more modules 209.

In an embodiment, the plurality of automation requests 103 may include requests related to a plurality of enterprise digital automation processes. The plurality of automation requests 103 may be provided to the automation management system 101 for execution and monitoring.

In an embodiment, the one or more alerts 109 is generated in real-time based on a comparison between a real-time performance of the plurality of automation requests 103 and one or more prestored Key Performance Indicators (KPIs). In an embodiment, the one or more alerts 109 indicate at least one of an overloading of software automation, an underutilization of the software automation, an application issue, a Central Processing Unit (CPU) issue, a memory issue, an unexpected window title, a system issue, a breach of Service Level Agreement (SLA), and an exception raise. Further, the one or more alerts 109 may be related to an operational insight and/or business insight and/or application insight.

In an embodiment, the automation requests information 211 may include a criticality of the plurality of automation requests 103, historical resource utilization data and failure data related to one or more historical automation requests that are similar to the plurality of automation requests 103. The criticality of the plurality of automation requests 103 relates to how important the automation request is. The historical resource utilization data provides an information related to the resource utilization by one or more historical automation requests 215. The failure data provides an information related to the one or more historical automation requests 215 failed which may be similar to the plurality of automation requests 103. The plurality of automation requests 103 may be prioritized based on the automation request information 211.

In an embodiment, the run-time cost 213, may be the cost associated with each of the plurality of tasks 107. In an embodiment, the execution of plurality of automation requests 103 in real-time is monitored by tracking a run-time cost and benefit for each of the plurality of tasks 107.

In an embodiment, the one or more historical automation requests 215 may be one or more automation requests executed previously which may be similar to the plurality of automation requests 103.

In an embodiment, the historical events information 217 is the information used to train pretrained Artificial Intelligence (AI) model. As an example, the information related to number of times an automation request was executed successfully, cost associated with the automation request may be stored. The AI model is used to optimize the execution of the plurality of automation requests 103 by resolving each of the one or more alerts 109.

In an embodiment, the data 207 may be processed by the one or more modules 209 of the automation management system 101. In some implementations, the one or more modules 209 may be communicatively coupled to the processor 203 for performing one or more functions of the automation management system 101. In an implementation, the one or more modules 209 may include, without limiting to, a prioritizing module 221, a selecting module 223, a monitoring module 225, a generating module 227, an optimizing module 229 and other modules 231.

As used herein, the term module may refer to an Application Specific Integrated Circuit (ASIC), an electronic circuit, a hardware processor (shared, dedicated, or group) and memory that execute one or more software or firmware programs, a combinational logic circuit, and/or other suitable components that provide the described functionality. In an implementation, each of the one or more modules 209 may be configured as stand-alone hardware computing units. In an embodiment, the other modules 231 may be used to perform various miscellaneous functionalities of the automation management system 101. It will be appreciated that such one or more modules 209 may be represented as a single module or a combination of different modules.

In an embodiment, the prioritizing module 221 prioritizes the plurality of automation requests 103. The plurality of automation requests 103 may be related to a plurality of enterprise digital automation processes. The prioritizing module 221 prioritizes based on automation requests information 211. The automation requests information 211 may comprise criticality of the plurality of automation requests 103, historical resource utilization data and failure data related to one or more historical automation request 215$s$ that are similar to the plurality of automation requests 103. The prioritizing module 221 compares the plurality of automation requests 103 with a predefined automation criterion. Further, the prioritizing module 221 maps the plurality of automation requests 103 with preconfigured templates stored in a template repository. The prioritizing module 221 identifies the plurality of tasks 107 corresponding to each of the plurality of automation requests 103 by performing a feasibility analysis, a t-shirt size estimation, a Return of Investment (ROI) analysis and a business case creation.

In an embodiment, the prioritizing module 221 receives plurality of automation requests 103 together with automation objectives and resource requirement. The automation request portfolio forecasting is assessed by utilizing "What/If" analysis associated with certain predefined check rules and/or criteria. The prioritizing module 221 unit identifies the criticality of the automation requests. The criticality of the automation requests may be provided by the user itself and/or it can be determined by the context and objective of the plurality of automation requests 103. The identified criticality is also compared with the criticality of historical automation request 215$s$ with similar objectives. The prioritizing module 221 is a tech agnostic plug & play module which receives automation heartbeats and/or exceptions together with automation objectives, resource requirement and criticality. The prioritizing module 221 tracks all the resources and monitors the utilization rate of the resources. The resource can be system resource, human resource and digital initiatives. The prioritizing module 221 also determines the availability of the resource and compares with the resource requirement in the each of the plurality of automation requests 103. The plug and play feature may also work on the presentation layer of the digital initiatives and is completely agnostic to the technology the initiative runs.

In an embodiment, the selecting module 223 selects a plurality of tasks 107 from a project application repository 105 for executing the plurality of automation requests 103. The selecting module 223 selects a plurality of tasks 107 based on a type of the plurality of automation requests 103 and execution requirements of the plurality of automation requests 103. As an example, if one of the automation requests in the plurality of automation requests 103 is related to Human Resource (HR) business, then HR business and associated automation technology related tasks are loaded from the project application repository 105. The selecting module 223 also clocks actual cost for people, license, infrastructure, maintenance during both build and run phase. Further, the selecting module 223 tracks resource utilization and availability while assigning new tasks.

In an embodiment, the monitoring module 225 monitors execution of the plurality of automation requests 103 in real-time. The monitoring module 225 generates a unified portfolio view of the plurality of tasks 107 and by tracking a run-time cost 213 and benefit for each of the plurality of tasks 107. The unified portfolio view may include the plurality of tasks 107 in a backlog, in-process and completed. For the in-process tasks, the monitoring module 225 also provides estimated hours, spent hours and remaining hours for each process automation tasks. The monitoring module 225 also tracks real-time business benefits against the original one by providing KPI analysis. The monitoring module 225 deploys a plurality of automation agents for rectifying one or more machine-level service glitches, application failures and automation breakdowns during the execution of the plurality of automation requests 103. The monitoring module 225 dynamically restarts the execution of the plurality of automation requests 103. Further, the monitoring module 225 generates an execution status report for each of the plurality of automation requests 103.

In an embodiment, the generating module 227 generates in real-time, one or more alerts 109 related to the execution of the plurality of automation requests 103. The generating module 227 generates one or more alerts 109 based on a comparison between a real-time performance of the plurality of automation requests 103 and one or more prestored Key Performance Indicators (KPIs). The generating module 227 automatically creates a ticket corresponding to one or more failed automation requests. Further, the generating module 227 notifies the ticket to one or more predefined automation controllers for rectifying the one or more failed automation requests. In an embodiment, one or more alerts 109 indicate at least one of an overloading of software automation, an underutilization of the software automation, an application issue, a Central Processing Unit (CPU) issue, a memory issue, an unexpected window title, a system issue, a breach of Service Level Agreement (SLA), and an exception raise.

In an embodiment, the optimizing module 229 optimizes the execution of the plurality of automation requests 103 by resolving each of the one or more alerts 109 using a pretrained Artificial Intelligence (AI) model trained on one or more historical events information 217 associated with the plurality of automation requests 103. Further, the optimizing module 229 provides an auto heal capability which automatically resumes struck automation system back to running using one or more API agents. The optimizing module 229 triggers the auto heal functionality based on different traps. As an example, the traps may be an application traps Central Processing Unit (CPU), an application traps memory utilization, system traps window titles, CPU and memory of the application and process transoft error. The optimizing module 229 provides an operational level control to reduce downtime. Finally, the one or more alerts 109 are resolved and the execution of the plurality of automation requests 103 is resumed and/or completed.

Figure 3:
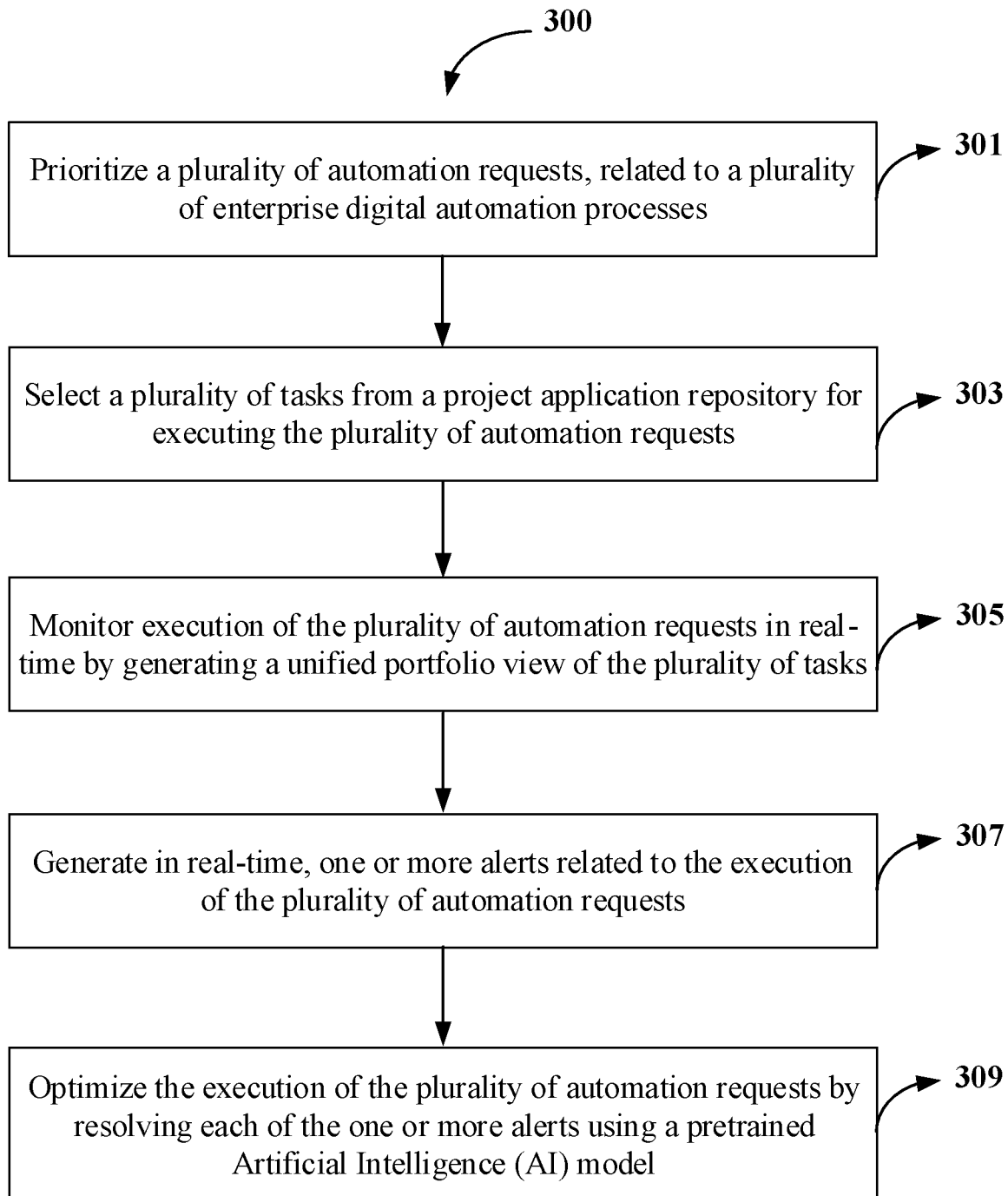
FIG. 3 shows a flowchart illustrating a method for managing enterprise digital automation processes, in accordance with some embodiments of the present disclosure.

FIG. 3 shows a flowchart illustrating a method for managing enterprise digital automation processes, in accordance with some embodiments of the present disclosure.

As illustrated in FIG. 3, the method 300 may include one or more blocks illustrating a method for managing enterprise digital automation processes using an automation management system 101 illustrated in FIG. 2. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the method 300 includes prioritizing, by the automation management system 101, a plurality of automation requests 103, related to a plurality of enterprise digital automation processes. In an embodiment, the plurality of automation requests 103 may be prioritized based on a criticality of the plurality of automation requests 103, historical resource utilization data and failure data related to one or more historical automation request 215*s* that are similar to the plurality of automation requests 103. In an embodiment, the plurality of automation requests 103 is compared with a predefined automation criterion. The plurality of automation requests 103 with preconfigured templates stored in a template repository. Further, a plurality of tasks 107 corresponding to each of the plurality of automation requests 103 is identified by performing a feasibility analysis, a t-shirt size estimation, a Return of Investment (ROI) analysis and a business case creation.

At block 303, the method 300 includes selecting, by the automation management system 101, a plurality of tasks 107 from a project application repository 105 for executing the plurality of automation requests 103. In an embodiment, the plurality of tasks 107 may be selected based on a type of the plurality of automation requests 103 and execution requirements of the plurality of automation requests 103.

At block 305, the method 300 includes monitoring, by the automation management system 101, execution of the plurality of automation requests 103 in real-time by generating a unified portfolio view of the plurality of tasks 107 and by tracking a run-time cost 213 and benefit for each of the plurality of tasks 107. In an embodiment, a plurality of automation agents is deployed for rectifying one or more machine-level service glitches, application failures and automation breakdowns during the execution of the plurality of automation requests 103. The plurality of automation requests 103 execution is dynamically restarted. Further, an execution status report for each of the plurality of automation requests 103 is generated.

At block 307, the method 300 includes generating, by the automation management system 101, one or more alerts 109 related to the execution of the plurality of automation requests 103. In an embodiment, the one or more alerts 109 is generated based on a comparison between a real-time performance of the plurality of automation requests 103 and one or more prestored Key Performance Indicators (KPIs). In an embodiment, a ticket is automatically created corresponding to one or more failed automation requests. Further, the ticket to one or more predefined automation controllers is notified for rectifying the one or more failed automation requests. In an embodiment, one or more alerts 109 indicate at least one of an overloading of software automation, an underutilization of the software automation, an application issue, a Central Processing Unit (CPU) issue, a memory issue, an unexpected window title, a system issue, a breach of Service Level Agreement (SLA), and an exception raise.

At block 309, the method 300 includes optimizing, by the automation management system 101, the execution of the plurality of automation requests 103 by resolving each of the one or more alerts 109 using a pretrained Artificial Intelligence (AI) model trained on one or more historical events associated with the plurality of automation requests 103. Finally, the one or more alerts 109 are resolved and the execution of the plurality of automation requests 103 is resumed and/or completed.

Computer System

Figure 4:
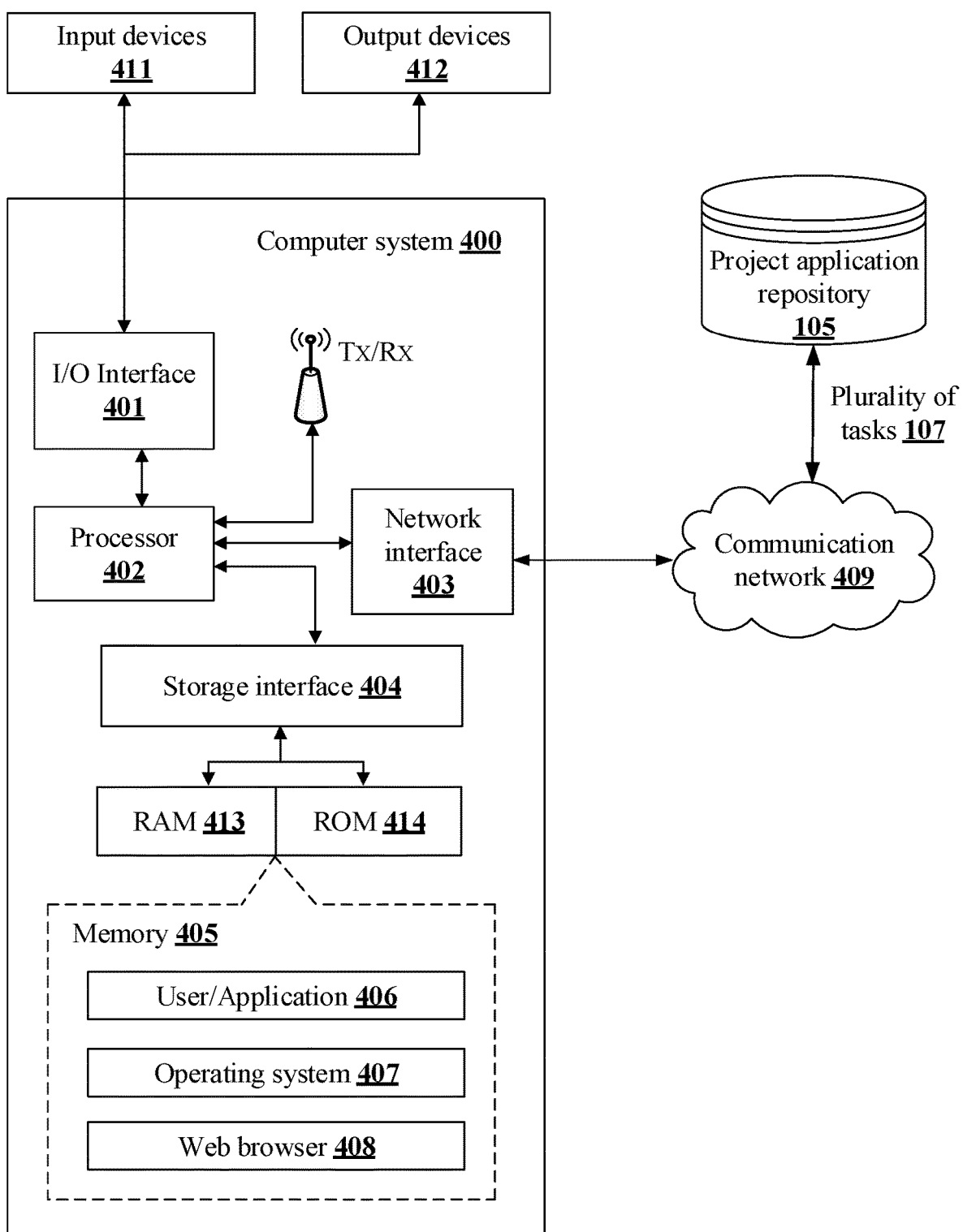
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be the automation management system 101 illustrated in FIG. 2, which may be used for managing enterprise digital automation processes. The computer system 400 may include a central processing unit ("CPU" or "processor" or "memory controller") 402. The processor 402 may comprise at least one data processor for executing program components for executing user- or system-generated business processes. A user may include a Robotic process Automation (RPA) architect, head of operations, Information Technology (IT) head or any system/sub-system being operated parallelly to the computer system 400. The processor 402 may include specialized processing units such as integrated system (bus) controllers, memory controllers/ memory management control units, floating point units, graphics processing units, digital signal processing units, etc.

The processor 402 may be disposed in communication with one or more Input/Output (I/O) devices (411 and 412) via I/O interface 401. The I/O interface 401 may employ communication protocols/methods such as, without limitation, audio, analog, digital, stereo, IEEE®-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE® 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc.

In an implementation, the communication network 409 may be implemented as one of the several types of networks, such as intranet or Local Area Network (LAN) and such within the organization. The communication network 409 may either be a dedicated network or a shared network, which represents an association of several types of networks that use a variety of protocols, for example, Hypertext Transfer Protocol (HTTP), Transmission Control Protocol/ Internet Protocol (TCP/IP), Wireless Application Protocol (WAP) etc., to communicate with each other. Further, the communication network 409 may include a variety of network devices, including routers, bridges, servers, computing devices, storage devices, etc. In an embodiment, the communication network 409 may be used for interfacing with a project application repository 105 for storing a plurality of tasks 107 related to the plurality of automation requests 103.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/ application interface 406, an operating system 407, a web browser 408, and the like. In some embodiments, computer system 400 may store user/application data 406, such as the data, variables, records, etc. as described in this invention. Such databases may be implemented as fault-tolerant, relational, scalable, secure databases such as Oracle® or Sybase®.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

The user interface 406 may facilitate display, execution, interaction, manipulation, or operation of program components through textual or graphical facilities. For example, the user interface 406 may provide computer interaction interface elements on a display system operatively connected to the computer system 400, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 408 may be a hypertext viewing application. Secure web browsing may be provided using Secure Hypertext Transport Protocol (HTTPS), Secure Sockets Layer (SSL), Transport Layer Security (TLS), and the like. The web browsers 408 may utilize facilities such as AJAX, DHTML, ADOBE® FLASH®, JAVASCRIPT®, JAVA®, Application Programming Interfaces (APIs), and the like. Further, the computer system 400 may implement a mail server stored program component. The mail server may utilize facilities such as ASP, ACTIVEX®, ANSI® C++/C#, MICROSOFT®, .NET, CGI SCRIPTS, JAVA®, JAVASCRIPT®, PERL®, PUP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUT-LOOK®, MOZILLA® THUNDERBIRD®, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiments of the Present Disclosure are Illustrated Herein In an embodiment, the present disclosure provides real-time self-healing capability in case of automation failures, significantly increasing the machine and license utilization for the plurality of automations.

In an embodiment, the present disclosure provides a real-time view of individual automations with their health status and number of transactions processed, exceptions occurred, custom KPI's and Business Intelligence (BI) reports.

In an embodiment, the present disclosure provides an ability to configure alerts which gives improved operational control and increases the visibility of all the processes executed by the digital workforce.

In light of the technical advancements provided by the disclosed method and the automation management system, the claimed steps, as discussed above, are not routine, conventional, or well-known aspects in the art, as the claimed steps provide the aforesaid solutions to the technical problems existing in the conventional technologies. Further, the claimed steps clearly bring an improvement in the functioning of the system itself, as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device/article is described herein (whether they cooperate), it will be clear that a single device/article may be used in place of the more than one device/article or a different number of devices/articles may be used instead of the shown number of devices or programs. The functionality and/or features of a device may be alternatively embodied by one or more other devices which are not explicitly described as having such functionality/features. Thus, other embodiments of invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 101 | Automation management system |
| 103 | Plurality of automation requests |
| 105 | Project application repository |
| 107 | Plurality of tasks |
| 109 | Alerts |
| 201 | I/O Interface |
| 203 | Processor |
| 205 | Memory |
| 207 | Data |
| 209 | Modules |
| 211 | Automation requests information |
| 213 | Run-time cost |
| 215 | Historical automation request |
| 217 | Historical events information |
| 219 | Other data |
| 221 | Prioritizing module |
| 223 | Selecting module |
| 225 | Monitoring module |
| 227 | Generating module |
| 229 | Optimizing module |
| 231 | Other modules |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User/Application |
| 407 | Operating system |
| 408 | Web browser |
| 409 | Communication network |
| 411 | Input devices |
| 412 | Output devices |
| 413 | RAM |
| 414 | ROM |

We claim:

1. A method for managing enterprise digital automation processes, the method comprising:

prioritizing, by an automation management system, a plurality of automation requests, related to a plurality of enterprise digital automation processes, based on a criticality of the plurality of automation requests, historical resource utilization data and failure data related to one or more historical automation requests that are similar to the plurality of automation requests;

selecting, by the automation management system, a plurality of tasks from a project application repository for executing the plurality of automation requests based on a type of the plurality of automation requests and execution requirements of the plurality of automation requests;

monitoring, by the automation management system, execution of the plurality of automation requests in real-time by generating a unified portfolio view of the plurality of tasks and by tracking a run-time cost and benefit for each of the plurality of tasks;

generating, by the automation management system, in real-time, one or more alerts related to the execution of the plurality of automation requests based on a comparison between a real-time performance of the plurality of automation requests and one or more prestored Key Performance Indicators (KPIs); and optimizing, by the automation management system, the execution of the plurality of automation requests by resolving each of the one or more alerts using a pretrained Artificial Intelligence (AI) model trained on one or more historical events associated with the plurality of automation requests, wherein the optimizing the execution of the plurality of automation requests comprises:

triggering, by the automation management system, an auto heal functionality based on different traps, wherein the auto heal functionality automatically resumes stuck automation system back to running using one or more API agents; and providing, by the automation management system, an operational level control to reduce downtime.

2. The method as claimed in claim 1, wherein prioritizing the plurality of automation requests comprises:

comparing the plurality of automation requests with a predefined automation criteria;

mapping the plurality of automation requests with pre-configured templates stored in a template repository; and identifying the plurality of tasks corresponding to each of the plurality of automation requests by performing a feasibility analysis, a t-shirt size estimation, a Return of Investment (ROI) analysis and a business case creation.

3. The method as claimed in claim 1, wherein monitoring execution of the plurality of automation requests comprises:

deploying a plurality of automation agents for rectifying one or more machine-level service glitches, application failures and automation breakdowns during the execution of the plurality of automation requests;

dynamically restarting the execution of the plurality of automation requests; and generating an execution status report for each of the plurality of automation requests.

4. The method as claimed in claim 1, wherein generating the one or more alerts comprises:

automatically creating a ticket corresponding to one or more failed automation requests; and notifying the ticket to one or more predefined automation controllers for rectifying the one or more failed automation requests.

5. The method as claimed in claim 1, wherein the one or more alerts indicate at least one of an overloading of software automation, an underutilization of the software automation, an application issue, a Central Processing Unit (CPU) issue, a memory issue, an unexpected window title, a system issue, a breach of Service Level Agreement (SLA), and an exception raise.

6. An automation management system for managing enterprise digital automation processes, the automation management system comprising:

a processor; and a memory, communicatively coupled to the processor, wherein the memory stores processor-executable instructions, which, on execution, causes the processor to:

prioritize a plurality of automation requests, related to a plurality of enterprise digital automation processes, based on a criticality of each of the plurality of automation requests, historical resource utilization data and failure data related to one or more historical automation requests that are similar to the plurality of automation requests;

select a plurality of tasks from a project application repository for executing the plurality of automation requests based on a type of the plurality of automation requests and execution requirements of the plurality of automation requests;

monitor execution of the plurality of automation requests in real-time by generating a unified portfolio view of the plurality of tasks and by tracking a run-time cost and benefit for each of the plurality of tasks;

generate in real-time, one or more alerts related to the execution of the plurality of automation requests based on a comparison between a real-time performance of the plurality of automation requests and one or more prestored Key Performance Indicators (KPIs); and optimize the execution of the plurality of automation requests by resolving each of the one or more alerts using a pretrained Artificial Intelligence (AI) model trained on one or more historical events associated with the plurality of automation requests, wherein the optimize the execution of the plurality of automation requests comprises:

trigger an auto heal functionality based on different traps, wherein the auto heal functionality automatically resumes stuck automation system back to running using one or more API agents; and provide an operational level control to reduce downtime.

7. The automation management system as claimed in claim 6, wherein the processor prioritizes the plurality of automation requests by:

comparing the plurality of automation requests with a predefined automation criteria;

mapping the plurality of automation requests with pre-configured templates stored in a template repository; and identifying a plurality of tasks corresponding to each of the plurality of automation requests by performing a feasibility analysis, a t-shirt size estimation, a Return of Investment (ROI) analysis and a business case creation.

8. The automation management system as claimed in claim 6, wherein the processor monitors the execution of the plurality of automation requests by:

deploying a plurality of automation agents for rectifying one or more machine-level service glitches, application failures and automation breakdowns during the execution of the plurality of automation requests;

dynamically restarting the execution of the plurality of automation requests; and generating an execution status report for each of the plurality of automation requests.

9. The automation management system as claimed in claim 6, wherein generating the one or more alerts comprises:

automatically creating a ticket corresponding to one or more failed automation requests; and notifying the ticket to one or more predefined automation controllers for rectifying the one or more failed automation requests.

10. The automation management system as claimed in claim 6, wherein the one or more alerts indicate at least one of an overloading of software automation, an underutilization of software automation, an application issue, a Central Processing Unit (CPU) issue, a memory issue, an unexpected window title, a system issue, a breach of a Service Level Agreement (SLA), and an exception raise.

11. A non-transitory computer readable medium including instructions stored thereon that when processed by at least one processor, cause an automation management system to perform operations comprising:

prioritizing a plurality of automation requests, related to a plurality of enterprise digital automation processes, based on a criticality of each of the plurality of automation requests, historical resource utilization data and failure data related to one or more historical automation requests that are similar to the plurality of automation requests;

selecting a plurality of tasks from a project application repository for executing the plurality of automation requests based on a type of the plurality of automation requests and execution requirements of the plurality of automation requests;

monitoring execution of the plurality of automation requests in real-time by generating a unified portfolio view of the plurality of tasks and by tracking a run-time cost and benefit for each of the plurality of tasks;

generating in real-time, one or more alerts related to the execution of the plurality of automation requests based on a comparison between a real-time performance of the plurality of automation requests and one or more prestored Key Performance Indicators (KPIs); and optimizing the execution of the plurality of automation requests by resolving each of the one or more alerts using a pretrained Artificial Intelligence (AI) model trained on one or more historical events associated with the plurality of automation requests, wherein the optimizing the execution of the plurality of automation requests comprises:

triggering an auto heal functionality based on different traps, wherein the auto heal functionality automatically resumes stuck automation system back to running using one or more API agents; and providing an operational level control to reduce downtime.

\* \* \* \* \*